United States Patent [19]

Choo et al.

[11] Patent Number: 5,727,011
[45] Date of Patent: Mar. 10, 1998

[54] GAS LASER APPARATUS WITH GAS CIRCULATION ARRANGEMENT

[75] Inventors: Doukei Choo, Amagasaki; Shigeki Yamane, Kobe, both of Japan

[73] Assignee: Matsushita Electric Industrial Co., Ltd., Osaka, Japan

[21] Appl. No.: 661,966

[22] Filed: Jun. 12, 1996

[30] Foreign Application Priority Data

Jun. 14, 1995 [JP] Japan ............... 7-147192

[51] Int. Cl.$^6$ ................ H01S 3/22
[52] U.S. Cl. ................ 372/58
[58] Field of Search ............... 372/55, 58, 59

[56] References Cited

U.S. PATENT DOCUMENTS

| | | | |
|---|---|---|---|
| 4,351,052 | 9/1982 | Sasaki et al. | 372/68 |
| 4,547,885 | 10/1985 | Allen et al. | 372/59 |
| 4,573,162 | 2/1986 | Bakowsku et al. | 372/58 |
| 4,596,016 | 6/1986 | Morita et al. | 372/58 |
| 4,610,014 | 9/1986 | Martinen et al. | 372/59 |
| 4,646,336 | 2/1987 | Koseki | 372/58 |
| 4,660,209 | 4/1987 | Osada et al. | 372/58 |
| 4,661,958 | 4/1987 | Bowes et al. | 372/59 |
| 4,672,620 | 6/1987 | Slusher et al. | 372/58 |
| 4,709,372 | 11/1987 | Rando et al. | 372/59 |
| 5,060,238 | 10/1991 | Karube et al. | 372/58 |
| 5,124,997 | 6/1992 | Funakubo et al. | 372/58 |
| 5,206,873 | 4/1993 | Funakubo et al. | 372/58 |
| 5,426,659 | 6/1995 | Sugiyama et al. | 372/58 |
| 5,450,435 | 9/1995 | Yamane et al. | 372/58 |
| 5,461,636 | 10/1995 | Karube et al. | 372/58 |
| 5,528,618 | 6/1996 | Schlie et al. | 372/58 |

FOREIGN PATENT DOCUMENTS 1189974  7/1989  Japan.

*Primary Examiner*—Leon Scott, Jr.
*Attorney, Agent, or Firm*—Pollock, Vande Sande & Priddy

[57] ABSTRACT

A laser apparatus includes an output mirror and a total reflection mirror. A discharge tube is located between the output mirror and the total reflection mirror. The discharge tube contains laser medium gas. A first block connected to a first end of the discharge tube supports the first end of the discharge tube and also the output mirror. A second block connected to a second end of the discharge tube supports the second end of the discharge tube and also the total reflection mirror. A third block connected to an intermediate portion of the discharge tube supports the intermediate portion of the discharge tube. An optical bench supports the first block, the second block, and the third block. A turboblower connected to the third block is supported by the third block. A first passage connects the turboblower and the first block. A second passage connects the turboblower and the second block. The turboblower draws the laser medium gas from the discharge tube via the third block and returns the laser medium gas to the discharge tube via the first passage, the second passage, the first block, and the second block.

11 Claims, 2 Drawing Sheets

GAS LASER APPARATUS WITH GAS CIRCULATION ARRANGEMENT

BACKGROUND OF THE INVENTION

1. Field of the Invention

This invention relates to a gas laser apparatus with a gas circulation arrangement.

2. Description of the Prior Art

In microwave powered gas laser apparatus, molecules of laser medium gas are excited to high energy states by microwave or RF power through a discharge process to provide laser oscillation. The laser medium gas is heated during the laser oscillation. To continuously attain a high efficiency of the laser oscillation, it is desirable to cool the laser medium gas.

Japanese published unexamined patent application 1-189974 discloses a gas laser apparatus with a cooling arrangement. The gas laser apparatus in Japanese application 1-189974 includes a discharge tube filled with laser medium gas. A pair of electrodes connected to an RF power supply extend along opposite sides of the discharge tube respectively. The electrodes apply RF power to the laser medium gas in the discharge tube, thereby exciting the laser medium gas and providing laser oscillation. In Japanese application 1-189974, the cooling arrangement in the gas laser apparatus has a cooling passage. First and second ends of the cooling passage are connected to opposite ends of the discharge tube respectively. A turboblower disposed in the cooling passage circulates the laser medium gas through the discharge tube and the cooling passage. Coolers connected to the cooling passage serve to cool the laser medium gas. The turboblower in Japanese application 1-189974 uses a magnetic bearing.

SUMMARY OF THE INVENTION

It is an object of this invention to provide an improved gas laser apparatus with a gas circulation arrangement.

A first aspect of this invention provides a laser apparatus comprising an output mirror; a total reflection mirror; a discharge tube located between the output mirror and the total reflection mirror and containing laser medium gas; a first block connected to a first end of the discharge tube and supporting the first end of the discharge tube and also the output mirror; a second block connected to a second end of the discharge tube and supporting the second end of the discharge tube and also the total reflection mirror; a third block connected to an intermediate portion of the discharge tube and supporting the intermediate portion of the discharge tube; an optical bench supporting the first block, the second block, and the third block; a turboblower connected to the third block and being supported by the third block; a first passage connecting the turboblower and the first block; and a second passage connecting the turboblower and the second block; wherein the turboblower draws the laser medium gas from the discharge tube via the third block and return the laser medium gas to the discharge tube via the first passage, the second passage, the first block, and the second block.

A second aspect of this invention is based on the first aspect thereof, and provides a laser apparatus wherein an axis of the turboblower, a vertically-extending principal axis of the third block 11, and a vertically-extending principal axis of the optical bench are substantially in alignment with each other.

A third aspect of this invention is based on the first aspect thereof, and provides a laser apparatus further comprising a heat exchanger provided between the third block and the turboblower.

A fourth aspect of this invention is based on the first aspect thereof, and provides a laser apparatus further comprising a heat exchanger provided in the first passage.

A fifth aspect of this invention is based on the fourth aspect thereof, and provides a laser apparatus further comprising another heat exchanger prodded in the second passage.

A sixth aspect of this invention is based on the first aspect thereof, and provides a laser apparatus further comprising a laser-apparatus support member supporting the optical bench, wherein an axis of the turboblower, a vertically-extending principal axis of the third block 11, a vertically-extending principal axis of the optical bench, and a vertically-extending principal axis of the laser-apparatus support member are substantially in alignment with each other.

A seventh aspect of this invention provides a laser apparatus comprising an output mirror; a total reflection mirror; a discharge tube located between the output mirror and the total reflection mirror and containing laser medium gas; a first block connected to a first end of the discharge tube and supporting the first end of the discharge tube and also the output mirror; a second block connected to a second end of the discharge tube and supporting the second end of the discharge tube and also the total reflection mirror; a third block connected to an intermediate portion of the discharge tube and supporting the intermediate portion of the discharge tube; a turboblower having an impeller; an optical bench having a gas inlet connected to the third block, a chamber following the gas inlet and accommodating the impeller of the turboblower, a first gas outlet connected to the first block, a second gas outlet connected to the second block, a first passage connecting the chamber and the first gas outlet, and a second passage connecting the chamber and the second gas outlet; wherein the turboblower draws the laser medium gas from the discharge tube into the chamber via the third block and returning the laser medium gas from the chamber to the discharge tube via the first passage, the second passage, the first block, and the second block.

An eighth aspect of this invention is based on the seventh aspect thereof, and provides a laser apparatus wherein the optical bench and the turboblower are symmetrical with respect to a straight line which coincides with an axis of the turboblower.

A ninth aspect of this invention is based on the seventh aspect thereof, and provides a laser apparatus further comprising a heat exchanger provided between the third block and the gas inlet of the optical bench.

A tenth aspect of this invention is based on the seventh aspect thereof, and provides a laser apparatus further comprising a first heat exchanger provided between the first block and the first gas outlet of the optical bench, and a second heat exchanger provided between the second block and the second gas outlet of the optical bench.

An eleventh aspect of this invention is based on the first aspect thereof, and provides a laser apparatus wherein the turboblower has a lower end formed with a downwardly-vertically-facing gas inlet, and the turboblower includes a magnetic bearing.

DESCRIPTION OF THE PREFERRED EMBODIMENTS

First Embodiment

Figure 1:
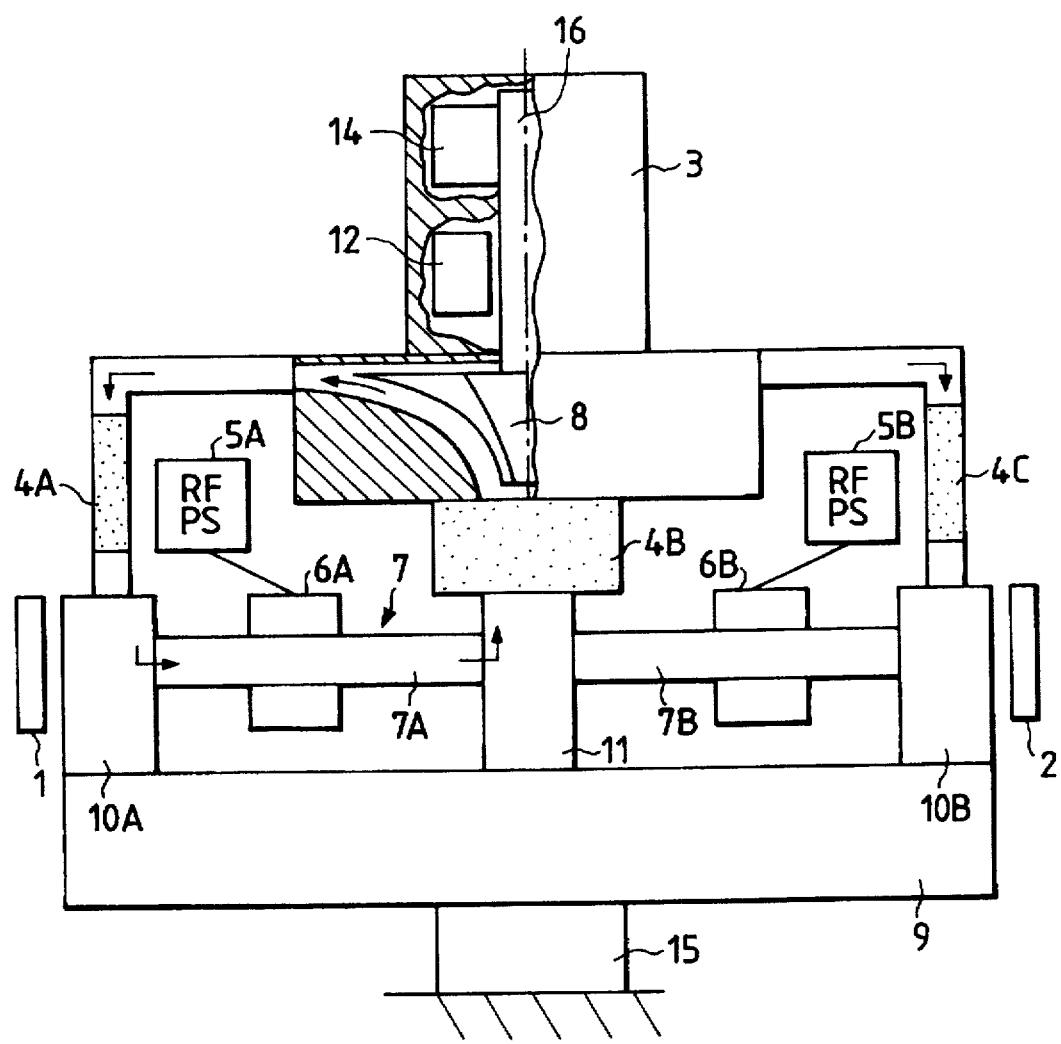
FIG. 1 is a diagrammatic side view, partly in section, of a laser apparatus according to a first embodiment of this invention.

With reference to FIG. 1, a laser apparatus includes an output mirror 1, an end mirror or a total reflection mirror 2, and a discharge tube 7. The discharge tube 7 horizontally extends between the output mirror 1 and the end mirror 2. The output mirror 1 and the end mirror 2 compose an optical resonator. The output mirror 1 faces one end of the discharge tube 7. The end mirror 2 faces the other end of the discharge tube 7. The discharge tube 7 is composed of halves 7A and 7B coaxially connected in tandem. The discharge tube 7 is filled with laser medium gas. The discharge tube 7 forms a part of a passage along which the laser medium gas flows.

The laser apparatus of FIG. 1 also includes RF power supplies 5A and 5B, and waveguides 6A and 6B. The waveguides 6A and 6B are coupled to the RF power supplies 5A and 5B respectively. The waveguides 6A and 6B are connected to the outer surfaces of the discharge-tube halves 7A and 7B respectively. RF power generated by the RF power supplies 5A and 5B is transmitted to the waveguides 6A and 6B before being applied to the laser medium gas in the discharge tube 7. The applied RF power excites the laser medium gas, thereby providing laser oscillation.

The laser apparatus of FIG. 1 has a cooling arrangement including a turboblower 3 and heat exchangers 4A, 4B, and 4C. The turboblower 3 has an impeller 8, a rotatable shaft 16, a magnetic bearing 12, and a motor 14. The impeller 8 is coaxially mounted on an end of the shaft 16. The motor 14 rotates the shaft 16 and the impeller 8. The magnetic bearing 12 rotatably supports the shaft 16. The magnetic bearing 12 serves as a non-contact bearing.

A main block 10A supports the output mirror 1 and one end of the discharge tube 7. Specifically, an end of the discharge-tube half 7A extends into the main block 10A. The main block 10A has a gas inlet which communicates with the interior of the discharge-tube half 7A.

A main block 10B supports the end mirror 2 and the other end of the discharge tube 7. Specifically, an end of the discharge-tube half 7B extends into the main block 10B. The main block 10B has a gas inlet which communicates with the interior of the discharge-tube half 7B An intermediate block 11 supports a central part of the discharge tube 7. Specifically, ends of the discharge-tube halves 7A and 7B extend into the intermediate block 11. The intermediate block 11 has a gas outlet which communicates with the interiors of the discharge-tube halves 7A and 7B.

The main blocks 10A and 10B and the intermediate block 11 are placed on and supported by an optical bench 9. The optical bench 9 is placed on and supported by a laser-apparatus support member 15. The laser-apparatus support member 15 is located on, for example, a floor.

The intermediate block 11 vertically aligns with the laser-apparatus support member 15. In other words, the intermediate block 11 extends directly above the laser-apparatus support member 15.

The heat exchanger 4B and the turboblower 3 are sequentially placed on the intermediate block 11. The intermediate block 11, the heat exchanger 4B, and the turboblower 3 vertically align with each other. The heat exchanger 4B is fixed to the intermediate block 11. A lower end of the turboblower 3 has a downwardly-vertically-facing gas inlet which communicates with the gas outlet of the intermediate block 11 via the heat exchanger 4B. The axes of the impeller 8 and the shaft 16 of the turboblower 3 extend vertically. The vertically-extending central axes (principal axes) of the turboblower 3, the heat exchanger 4B, the intermediate block 11, the optical bench 9, and the laser-apparatus support member 15 substantially align with each other. In addition, the rotation-center axis of the shaft 16 of the turboblower 3 substantially aligns with the vertically-extending central axes (principal axes) of the heat exchanger 4B, the intermediate block 11, the optical bench 9, and the laser-apparatus support member 15. Further, the axis of the turboblower 3 coincides with an extension of a vertical straight line connecting the centers of gravity of the heat exchanger 4B, the intermediate block 11, the optical bench 9, and the laser-apparatus support member 15.

The turboblower 3 has first and second gas outlets which communicate with the gas inlet thereof via a chamber accommodating the impeller 8. The first gas outlet of the turboblower 3 is connected to the gas inlet of the main block 10A via a cooling passage defined by a suitable pipe. The heat exchanger 4A is disposed in the cooling passage between the turboblower 3 and the main block 10A. The second gas outlet of the turboblower 16 is connected to the gas inlet of the main block 10B via a cooling passage defined by a suitable pipe. The heat exchanger 4C is disposed in the cooling passage between the turboblower 3 and the main block 10B.

During operation of the laser apparatus of FIG. 1, the turboblower 3 draws the laser medium gas from the discharge-tube halves 7A and 7B via the intermediate block 11 and the heat exchanger 4B. The laser medium gas is cooled by the heat exchanger 4B while passing therethrough. The turboblower 3 separates the incoming flow of the laser medium gas into two outgoing flows. The turboblower 3 drives one of the outgoing flows of the laser medium gas, along one of the cooling passages, toward the discharge-tube half 7A via the heat exchanger 4A and the main block 10A. Thus, the laser medium gas returns to the discharge-tube half 7A. The turboblower 3 drives the other outgoing flow of the laser medium gas, along the other cooling passage, toward the discharge-tube half 7B via the heat exchanger 4C and the main block 10B. Thus, the laser medium gas returns to the discharge-tube half 7B. The laser medium gas is cooled by the heat exchangers 4A and 4C while passing therethrough. In this way, the laser medium gas is circulated through the discharge-tube halves 7A and 7B and the cooling passages. In the discharge-tube halves 7A and 7B, the laser medium gas flows along axial directions.

As previously described, the turboblower 3 has the magnetic bearing 12. The turboblower 3 is placed on the heat exchanger 4B. The turboblower 3 has the downwardly-vertically-facing gas inlet which is connected to a gas outlet of the heat exchanger 4B. The heat exchanger 4B is fixed to the intermediate block 11. The intermediate block 11 is supported by the optical bench 9. The intermediate block 11 extends directly above the laser-apparatus support member 15. Accordingly, the total weight of the turboblower 3 is born by the laser-apparatus support member 15 via the heat exchanger 4B, the intermediate block 11, and the optical bench 9. As previously described, the vertically-extending central axes (principal axes) of the turboblower 3, the heat exchanger 4B, the intermediate block 11, the optical bench 9, and the laser-apparatus support member 15 substantially align with each other. This design prevents the optical bench 9 and the optical resonator from being adversely deformed. The optical resonator is placed on the optical bench 9. As previously described, the optical resonator includes the output mirror 1 and the end mirror 2. The turboblower 3 is advantageous in that the level of vibration generated thereby is relatively small. Further, the turboblower 3 is good in pressure loss. The magnetic bearing 12 in the turboblower 3 prevents the laser medium gas from being contaminated by lubricant although the gas inlet of the turboblower 3 faces downwardly. Further, the magnetic bearing 12 suppresses vibration of the turboblower 3.

The heat exchanger 4B may be omitted. In this case, the turboblower 3 is directly connected to the intermediate block 11. Also, it is preferable that the impeller 8 of the turboblower 3 is made of heat-resisting material such as ceramic.

As previously described, the rotation-center axis of the shaft 16 of the turboblower 3 substantially aligns with the vertically-extending central axes (principal axes) of the heat exchanger 4B, the intermediate block 11, the optical bench 9, and the laser-apparatus support member 15. It should be noted that the vertically-extending central axes (principal axes) of the shaft 16 of the turboblower 3, the heat exchanger 4B, the intermediate block 11, the optical bench 9, and the laser-apparatus support member 15 may be out of exact alignment with each other. In this case, it is sufficient that the vertically-extending central axes (principal axes) of the shaft 16 of the turboblower 3, the heat exchanger 4B, the intermediate block 11, and the optical bench 9 are in regions directly above the laser-apparatus support member 15.

It is preferable that the rotation-center axis of the shaft 16 of the turboblower 3 coincides with the vertically-extending central axis (principal axis) of the turboblower 3. It should be noted that the rotation-center axis of the shah 16 of the turboblower 3 may be out of exact coincidence with the vertically-extending central axis (principal axis) of the turboblower 3. In this case, it is sufficient that the vertically-extending central axis (principal axis) of the turboblower 3 is in a region directly above the laser-apparatus support member 15.

Second Embodiment

Figure 2:
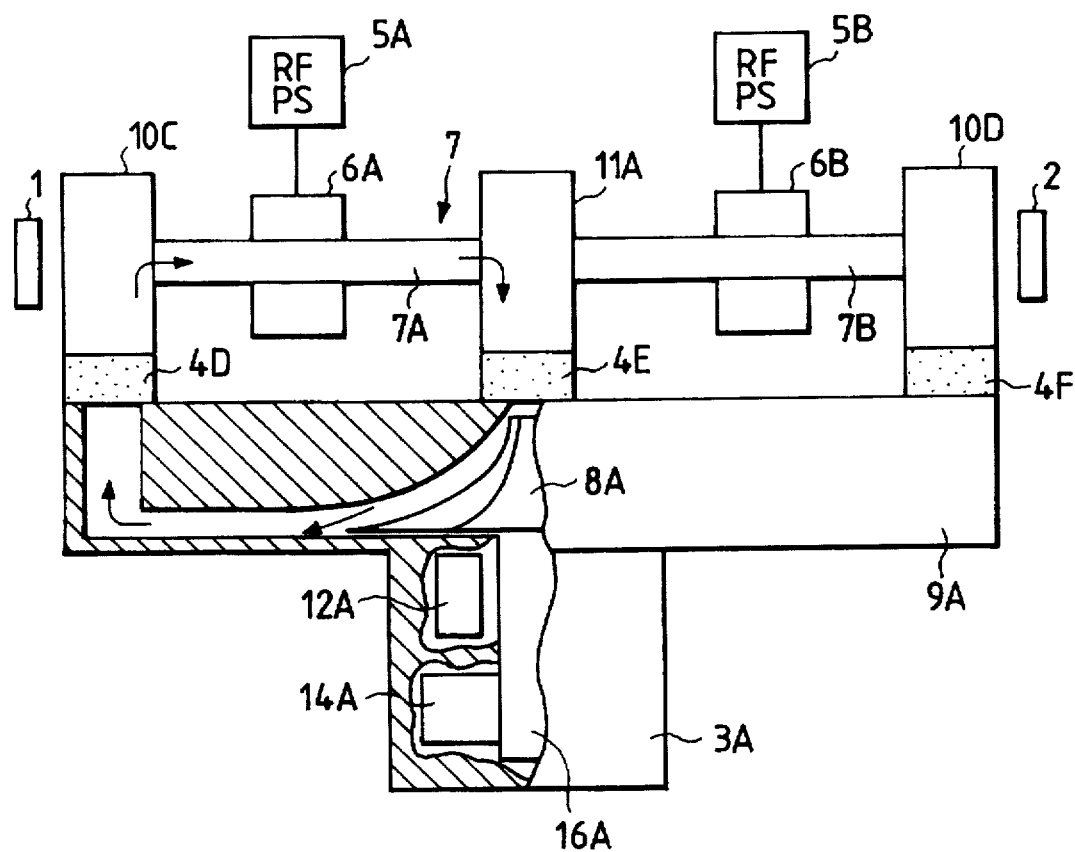
FIG. 2 is a diagrammatic top view, partly in section, of a laser apparatus according to a second embodiment of this invention.
Figure 3:
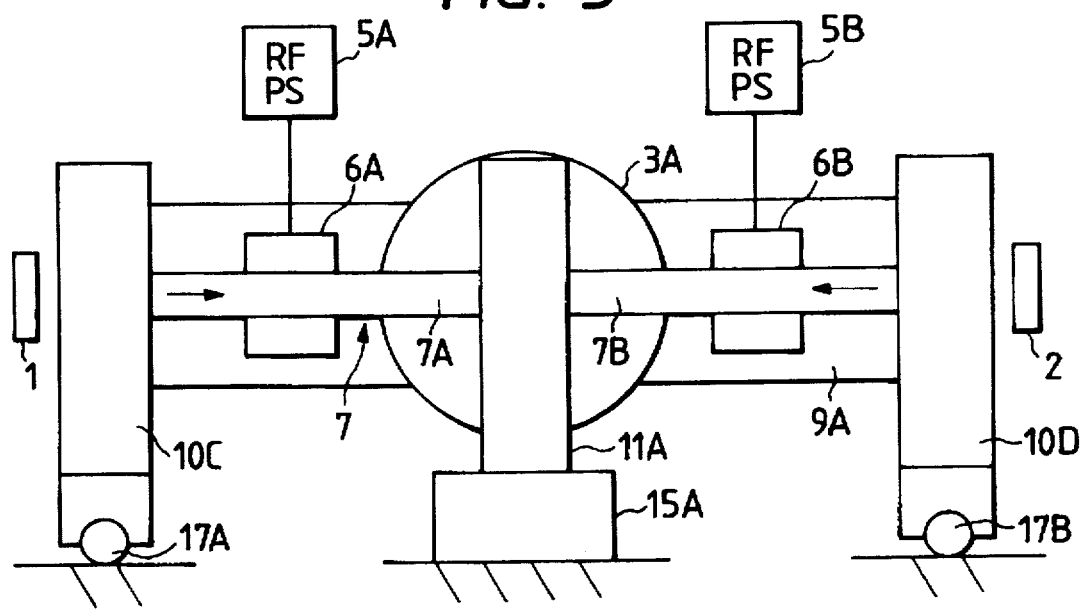
FIG. 3 is a front view of the laser apparatus in FIG. 2.

With reference to FIGS. 2 and 3, a laser apparatus includes an output mirror 1, an end mirror or a total reflection mirror 2, and a discharge tube 7. The discharge tube 7 horizontally extends between the output mirror 1 and the end mirror 2. The output mirror 1 and the end mirror 2 comprise an optical resonator. The output mirror 1 faces one end of the discharge tube 7. The end mirror 2 faces the other end of the discharge tube 7. The discharge tube 7 is composed of halves 7A and 7B coaxially connected in tandem. The discharge tube 7 is filled with laser medium gas. The discharge tube 7 forms a part of a passage along which the laser medium gas flows.

The laser apparatus of FIGS. 2 and 3 also includes RF power supplies 5A and 5B, and waveguides 6A and 6B. The waveguides 6A and 6B are coupled to the RF power supplies 5A and 5B respectively. The waveguides 6A and 6B are connected to the outer surfaces of the discharge-tube halves 7A and 7B respectively. RF power generated by the RF power supplies 5A and 5B is transmitted to the waveguides 6A and 6B before being applied to the laser medium gas in the discharge tube 7. The applied RF power excites the laser medium gas, thereby providing laser oscillation.

The laser apparatus of FIGS. 2 and 3 has a cooling arrangement including a turboblower 3A and heat exchangers 4D, 4E, and 4F. The turboblower 3A has an impeller 8A, a rotatable shaft 16A, a magnetic bearing 12A, and a motor 14A. The impeller 8A is coaxially mounted on an end of the shaft 16A. The motor 14A rotates the shaft 16A and the impeller 8A. The magnetic bearing 12A rotatably supports the shaft 16A. The magnetic bearing 12A serves as a non-contact bearing.

A main block 10C supports the output mirror 1 and one end of the discharge tube 7. Specifically, an end of the discharge-tube haft 7A extends into the main block 10C. The main block 10A has a gas inlet which communicates with the interior of the discharge-tube haft 7A.

A main block 10D supports the end mirror 2 and the other end of the discharge tube 7. Specifically, an end of the discharge-tube half 7B extends into the main block 10D. The main block 10D has a gas inlet which communicates with the interior of the discharge-tube half 7B An intermediate block 11A supports a central part of the discharge tube 7. Specifically, ends of the discharge-tube halves 7A and 7B extend into the intermediate block 11A. The intermediate block 11A has a gas outlet which communicates with the interiors of the discharge-tube halves 7A and 7B.

The main blocks 10C and 10D are located on, for example, a floor via sliders 17A and 17B respectively. The intermediate block 11A is placed on and supported by a laser-apparatus support member 15A. The laser-apparatus support member 15A is located on, for example, a floor.

The laser apparatus of FIGS. 2 and 3 includes an optical bench 9A provided with the turboblower 3A. The optical bench 9A is connected to sides of the main blocks 10C and 10D and the intermediate block 11A. The optical bench 9A has a gas inlet at a central part thereof. The optical bench 9A has two gas outlets at respective ends thereof. The optical bench 9A has a chamber following the gas inlet thereof and accommodating the impeller 8A of the turboblower 3A. The optical bench 9A has two cooling passages extending from the impeller-containing chamber to the respective gas outlets thereof. The axes of the shaft 16A and the impeller 8A of the turboblower 3A extend along a horizontal direction perpendicular to the axis of the discharge tube 7. The optical bench 9A and the turboblower 3A are symmetrical with respect to a straight line which coincides with the axes of the shaft 16A and the impeller 8A of the turboblower 3A. The gas inlet of the optical bench 9A corresponds in position to the gas outlet of the intermediate block 11A. The gas outlets of the optical bench 9A correspond in position to the gas inlets of the main blocks 10C and 10D respectively. The gas inlet of the optical bench 9a is equidistant from the main blocks 10C and 10D.

The gas inlet of the optical bench 9A communicates with the gas outlet of the intermediate block 11A via the heat exchanger 4E. One of the gas outlets of the optical bench 9A communicates with the gas inlet of the main block 10C via the heat exchanger 4D. The other gas outlet of the optical bench 9A communicates with the gas inlet of the main block 10D via the heat exchanger 4F.

During operation of the laser apparatus of FIGS. 2 and 3, the turboblower 3A draws the laser medium gas from the discharge-tube halves 7A and 7B via the intermediate block 11A and the heat exchanger 4E. The laser medium gas is cooled by the heat exchanger 4E while passing therethrough. The turboblower 3A separates the incoming flow of the laser medium gas into two outgoing flows. The turboblower 3A drives one of the outgoing flows of the laser medium gas, along one of the cooling passages, toward the discharge-tube half 7A via the heat exchanger 4D and the main block 10C. Thus, the laser medium gas returns to the discharge-tube half 7A. The turboblower 3A drives the other outgoing flow of the laser medium gas, along the other cooling passage, toward the discharge-tube half 7B via the heat exchanger 4F and the main block 10D. Thus, the laser medium gas returns to the discharge-tube half 7B. The laser medium gas is cooled by the heat exchangers 4D and 4F while passing therethrough. In this way, the laser medium gas is circulated through the discharge-tube halves 7A and 7B and the cooling passages. In the discharge-tube halves 7A and 7B, the laser medium gas flows along axial directions.

As previously described, the optical bench 9A has the cooling passages. The optical bench 9A is provided with the turboblower 3A. Specifically, the impeller 8A of the turboblower 3A is disposed in the chamber within the optical bench 9A. This arrangement of the optical bench 9A and the turboblower 3A enables the laser apparatus to be compact.

The turboblower 3A is advantageous in that the level of vibration generated thereby is relatively small. Further, the turboblower 3A is good in pressure loss. The magnetic bearing 12A in the turboblower 3A prevents the laser medium gas from being contaminated by lubricant. Further, the magnetic bearing 12A suppresses vibration of the turboblower 3A.

The heat exchanger 4E may be omitted. In this case, the turboblower 3A or the gas inlet of the optical bench 9A is directly connected to the intermediate block 11A. Also, it is preferable that the impeller 8A of the turboblower 3A is made of heat-resisting material such as ceramic.

What is claimed is:

1. A laser apparatus comprising:
   an output mirror;
   a total reflection mirror;
   a discharge tube located between the output mirror and the total reflection mirror and containing laser medium gas;
   a first block connected to a first end of the discharge tube and supporting the first end of the discharge tube and also the output mirror;
   a second block connected to a second end of the discharge tube and supporting the second end of the discharge tube and also the total reflection mirror;
   a third block connected to an intermediate portion of the discharge tube and supporting the intermediate portion of the discharge tube;
   an optical bench supporting the first block, the second block, and the third block;
   a turboblower connected to the third block and being supported by the third block;
   a first passage connecting the turboblower and he first block; and
   a second passage connecting the turboblower and the second block;
   wherein the turboblower draws the laser medium gas from the discharge tube via the third block along a direction having an upward portion and returns the laser medium gas to the discharge tube via the first passage, the second passage, the first block, and the second block; and
   wherein the turboblower includes an impeller, a rotatable shaft, a magnetic bearing, and a motor, the impeller having an axis extending in a vertical direction, the impeller being mounted on a lower end of the shaft, the shaft extending in the vertical direction, the motor being connected to the shaft for rotating the shaft, the motor extending above the impeller, the shaft being rotatably supported by the magnetic bearing on a non-contact basis.

2. The laser apparatus of claim 1, wherein an axis of the turboblower, a vertically-extending principal axis of the third block 11, and a vertically-extending principal axis of the optical bench are substantially in alignment with each other.

3. The laser apparatus of claim 1, further comprising a heat exchanger provided between the third block and the turboblower.

4. The laser apparatus of claim 1, further comprising a heat exchanger provided in the first passage.

5. The laser apparatus of claim 4, further comprising another heat exchanger provided in the second passage.

6. The laser apparatus of claim 1, further comprising a laser-apparatus support member supporting the optical bench, wherein an axis of the turboblower, a vertically-extending principal axis of the third block 11, a vertically-extending principal axis of the optical bench, and a vertically-extending principal axis of the laser-apparatus support member are substantially in alignment with each other.

7. The laser apparatus of claim 1, wherein the turboblower has a lower end formed with a downwardly-vertically-facing gas inlet, and the turboblower includes a magnetic bearing.

8. A laser apparatus comprising:
   an output mirror;
   a total reflection mirror;
   a discharge tube located between the output mirror and the total reflection mirror and containing laser medium gas;
   a first block connected to a first end of the discharge tube and supporting the first end of the discharge tube and also the output mirror;
   a second block connected to a second end of the discharge tube and supporting the second end of the discharge tube and also the total reflection mirror;
   a third block connected to an intermediate portion of the discharge tube and supporting the intermediate portion of the discharge tube;
   a turboblower having an impeller and a motor for rotating the impeller;
   an optical bench having a gas inlet connected to the third block, a chamber following the gas inlet and accommodating the impeller of the turboblower, a first gas outlet connected to the first block, a second gas outlet connected to the second block, a first passage connecting the chamber and the first gas outlet, and a second passage connecting the chamber and the second gas outlet, the optical bench forming a housing for the impeller of the turboblower, the optical bench forming a casing for the motor of the turboblower; and
   an apparatus support base connected to the third block for supporting the third block;
   wherein the turboblower draws the laser medium gas from the discharge tube into the chamber via the third block and returns the laser medium gas from the chamber to the discharge tube via the first passage, the second passage, the first block, and the second block.

9. The laser apparatus of claim 8, wherein the optical bench and the turboblower are symmetrical with respect to a straight line which coincides with an axis of the turboblower.

10. The laser apparatus of claim 8, further comprising a heat exchanger provided between the third block and the gas inlet of the optical bench.

11. The laser apparatus of claim 8, further comprising a first heat exchanger provided between the first block and the first gas outlet of the optical bench, and a second heat exchanger provided between the second block and the second gas outlet of the optical bench.

* * * * *